Bird & Smith,
India Rubber Wringer Roll.
No. 103,416.   Patented May 24, 1870.
FIG. 1.
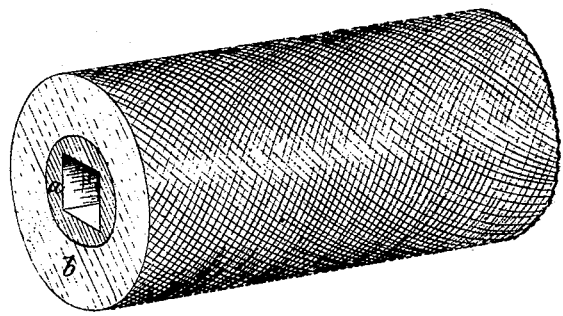
FIG. 2.   FIG. 3.   FIG. 4.
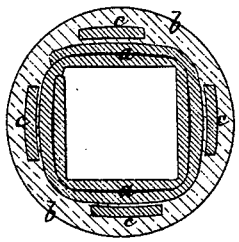 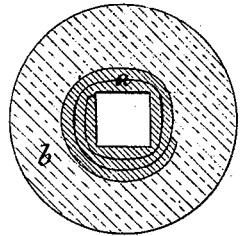 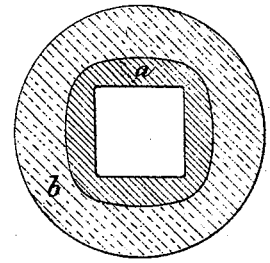
James R. Bird & Geo. C. Smith
by their attorney
A. Pollok
WITNESSES.

United States Patent Office.

JAMES R. BIRD, OF BROOKLYN, AND GEORGE C. SMITH, OF MATTEAWAN, NEW YORK.

Letters Patent No. 103,416, dated May 24, 1870.

IMPROVEMENT IN VULCANIZED INDIA-RUBBER ROLLS FOR WRINGERS, GRAIN-DRILLS, &c.

The Schedule referred to in these Letters Patent and making part of the same.

*To whom it may concern:*

Be it known that we, JAMES R. BIRD, of Brooklyn, in the county of Kings, and GEORGE C. SMITH, of Matteawan, county of Dutchess, State of New New York, have invented certain new and useful Improvements in Vulcanized India-rubber Rolls, for Wringers, Grain-Drills, and other implements or machinery or purposes, of which the following is a specification.

Great difficulty has heretofore been experienced in properly securing rubber rolls upon the rods or shafts, upon which they must be mounted for use. It was at first attempted to secure them by means of cement, which, however, proved to be an insecure mode of fastening, as the cement would soon give way, leaving the rubber loose upon its shaft. Afterward other modes of fastening the rubber were employed. Shafts of a peculiar form were used, having projections or ribs to enter the rubber, wire coils were wrapped around the rubber and mandrel, binding the one to the other, but all such attempts have proven more or less impracticable, owing to the failure to provide a secure fastening, or to the expense attending the manufacture.

The object of our invention is to secure the rubber upon its shaft cheaply and easily, and yet in such manner as to render it practically impossible for the roll to become loose and turn upon or slip around its shaft. To this end we make the roll of hard rubber in the center, where it surrounds and is in contact with the metal shaft, and of softer rubber toward the circumference, the proportion of hard and soft rubber varying according to the degree of hardness to be given to the roll, and the uses to which it is to be put. A mangle roll, for instance, should be made semi-hard, while a softer roll is needed for wringers, grain-drills, and like uses.

The manner in which our invention is or may be carried into effect will be readily understood by reference to the accompanying drawing, in which—

Figure 1 is a perspective view of a section of a roll made in accordance with our invention, with special reference to its use as a feed-roll in grain-drills.

Figures 2, 3, and 4 are cross-sections of other rolls, hereinafter described.

That portion, *a*, of the roll, in fig. 1, immediately surrounding the central mandrel or shaft, is made of a hard rubber compound, while that portion of the roll nearer the circumference is made of a softer compound, *b*. The hard rubber compound—or a compound of rubber so prepared that it will vulcanize into what is known as "hard rubber"—is first placed, while in the green or plastic state, upon and around the mandrel or shaft, and then over this compound is placed a layer, *b*, of compound, also in a green or plastic condition, which will vulcanize into a softer or more yielding and elastic rubber. The two are then vulcanized together. When the vulcanizing process is completed, the center of the roll will be of hard rubber or vulcanite, which will sit closely upon the shaft, and, being of a hard unyielding nature will effectually prevent the roll from turning upon or slipping around the shaft; and the exterior portion of the roll will be of softer and more elastic rubber, intimately united with the hard rubber center by vulcanization. The proportion of hard rubber and soft rubber in the roll will, as above stated, vary according to the uses to which the roll is to be put. In this figure the proportion of soft rubber is considerably greater than that of the hard, thus producing a yielding and elastic roll.

The shaft or mandrel employed should have a square or angular section, or should be otherwise suitably formed, so as to allow the hard rubber to take a firm hold upon it.

The hard rubber, when placed upon the shaft, should have a cylindrical exterior, in order that the thickness of the exterior layer of soft rubber may be, as nearly as possible, the same at all points, thus equalizing the elasticity of the roll. In making a rubber roll for grain-drills, the exterior surface of the roll should be roughened, scored, or indented, and to this end, when vulcanizing a roll, such as shown in fig. 1, we inclose it in a cylindrical mold, having formed in its interior the pattern which it is desired to impress upon the exterior of the roll. The indentations or projections formed by the mold may be of regular or irregular shape, and of such size and conformation as may be deemed desirable. The roll thus made can be used to advantage as a feed-roll in grain-drills and other machines for sowing grain, in fertilizers, and in other apparatus of a similar character.

Fig. 4 is a cross-section of a roll, such as shown in fig. 1, with the hard rubber center, somewhat larger than it is in said figure, and the roll is consequently less elastic and yielding.

In fig. 3 the hard rubber center is composed of a sheet of hard rubber compound, wound upon the mandrel or shaft to the desired thickness, and so that its exterior shall approach as nearly as desirable to a cylindrical form. The layer of soft rubber is placed over this, and the whole vulcanized in the usual way.

Fig. 2 is a section of a mangle-roll, in which the hard rubber sheet is wound upon a mandrel or shaft of considerable size, and, as in this instance, the rubber center is nearly rectangular in section, separate strips, *c*, of hard rubber compound are employed in addition, one laid upon each of the four sides of the hard rubber prism, so as to make the general form of the center practically cylindrical, thus equalizing the thickness of the thin exterior layer of soft rubber, and making all parts of the roll equally elastic.

If desired, any fibrous material may be mixed with the hard rubber to give it greater tenacity and strength, and the roll may be made of any desired degree of elasticity, being of hard rubber in the center and softer toward the circumference.

Having now described our invention, and the manner in which the same is and may be carried into effect—

What we claim, and desire to secure by Letters Patent, is—

1. A vulcanized India-rubber roll, made of rubber of varying degrees of hardness, the harder toward the center and the softer toward the circumference of the roll, substantially as and for the purposes shown and set forth.

2. A feed-roll for grain-drills and like uses, made of vulcanized India rubber, substantially as herein described, with a roughened, scored, or indented surface, for the purposes set forth.

In testimony whereof we have signed our names to this specification before two subscribing witnesses.

JAMES R. BIRD.
GEO. C. SMITH.

Witnesses:
C. VAN WAGENEN,
W. AL. VAN WAGENEN.